(12) United States Patent
Eltoni et al.

(10) Patent No.: US 12,070,737 B1
(45) Date of Patent: Aug. 27, 2024

(54) SYNTHESIS OF AMINO-RICH MESOPOROUS SILICA NANOPARTICLES FOR REMOVAL OF HEAVY METAL AND URANIUM CATIONS

(71) Applicant: KING SAUD UNIVERSITY, Riyadh (SA)

(72) Inventors: Ahmed Eltoni Mohamed Ali Eltoni, Riyadh (SA); Mohamed Abdelaty Habila, Riyadh (SA); Joselito Puzon Labis, Riyadh (SA); Ali Kanakhr Aldalbahi, Riyadh (SA); Asharf Elsayed Khater, Cairo (EG); Huda Saad Alnafie, Buraidah (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/380,763

(22) Filed: Oct. 17, 2023

(51) Int. Cl.
| | | |
|---|---|---|
| B01J 20/30 | (2006.01) | |
| B01J 20/10 | (2006.01) | |
| B01J 20/28 | (2006.01) | |
| B01J 20/32 | (2006.01) | |
| C02F 1/28 | (2023.01) | |
| C02F 101/00 | (2006.01) | |

(Continued)

(52) U.S. Cl.
CPC ......... *B01J 20/3057* (2013.01); *B01J 20/103* (2013.01); *B01J 20/28061* (2013.01); *B01J 20/28071* (2013.01); *B01J 20/28073* (2013.01); *B01J 20/3071* (2013.01); *B01J 20/3078* (2013.01); *B01J 20/3204* (2013.01); *B01J 20/3244* (2013.01); *C02F 1/288* (2013.01); *C02F 1/281* (2013.01); *C02F 1/285* (2013.01); *C02F 2101/006* (2013.01); *C02F 2101/20* (2013.01); *C02F 2101/308* (2013.01)

(58) Field of Classification Search
None
See application file for complete search history.

(56) References Cited

U.S. PATENT DOCUMENTS

| | | | | |
|---|---|---|---|---|
| 10,207,975 | B2 * | 2/2019 | Ditzel | C07C 51/09 |
| 2004/0267038 | A1 * | 12/2004 | Tatsumi | C07F 7/1804 |
| | | | | 556/413 |

(Continued)

OTHER PUBLICATIONS

Gao, C. and Che, S. (2010), Organically Functionalized Mesoporous Silica by Co-structure-Directing Route. Adv. Funct. Mater., 20: 2750-2768. https://doi.org/10.1002/adfm.201000074 (Year: 2010).*

(Continued)

*Primary Examiner* — Chester T Barry
(74) *Attorney, Agent, or Firm* — Nath, Goldberg & Meyer; Joshua B. Goldberg

(57) ABSTRACT

Amino-rich anionic mesoporous silica (AMS) nanoparticles prepared through adding two different types of co-structuring directing agent (CSDA) molecules, thus increasing the amino amount within the AMS together with preserving ordered porous structure. Further boosting of amino amount can be accomplished through linking three different CSDA molecules together. Amino-functionalized mesoporous silica can be obtained with high amino amounts with linking either double or triple CSDA molecules while preserving ordered mesoporous structure and high textural properties.

20 Claims, 3 Drawing Sheets

(51) Int. Cl.
*C02F 101/20* (2006.01)
*C02F 101/30* (2006.01)

(56) References Cited

U.S. PATENT DOCUMENTS

| | | | | |
|---|---|---|---|---|
| 2008/0199523 A1* | 8/2008 | Finnie | .................. | A61P 37/00 427/213.3 |
| 2009/0043003 A1* | 2/2009 | Tatsumi | ............. | B01J 20/28083 521/154 |
| 2010/0254890 A1* | 10/2010 | Yang | ..................... | B01J 20/103 423/592.1 |
| 2010/0310465 A1* | 12/2010 | Zink | ..................... | A61P 35/00 424/9.1 |
| 2010/0310539 A1* | 12/2010 | Garcia-Bennett | ...... | B01J 29/041 210/767 |
| 2011/0217623 A1* | 9/2011 | Jiang | .................. | H01M 8/1016 429/495 |
| 2016/0251287 A1* | 9/2016 | Kinage | ................... | B01J 29/40 568/814 |
| 2017/0145382 A1* | 5/2017 | Garcia-Bennett | ...... | A61K 35/30 |
| 2018/0105430 A1* | 4/2018 | Carnes | ................... | C01B 33/18 |

OTHER PUBLICATIONS

Alfonso E. Garcia-Bennett, Osamu Terasaki, Shunai Che, and Takashi Tatsumi Chemistry of Materials 2004 16 (5), 813-821, DOI: 10.1021/cm035074z (Year: 2004).*

Andriayani et al., "The effect concentration of tetraethylorthosilicate and variation HCl 0.1M for synthesis mesoporous silica using oleic acid as template and 3-aminopropyltrimethoxysilane as co-structure directing Agent", 2018 J. Phys .: Conf. Ser. 1116 042006.

* cited by examiner

SYNTHESIS OF AMINO-RICH MESOPOROUS SILICA NANOPARTICLES FOR REMOVAL OF HEAVY METAL AND URANIUM CATIONS

STATEMENT OF GOVERNMENT INTEREST

This invention was made with government support under grant no. 3-17-01-001-0003 awarded by the National Plan for Science, Technology, and Innovation (MAARIFAH), King Abdulaziz City for Science and Technology, Kingdom of Saudi Arabia.

BACKGROUND

1. Field

The present disclosure relates to the synthesis of amino-rich anionic mesoporous silica (AMS) nanoparticles while preserving ordered mesoporous structure and high textural properties.

2. Description of the Related Art

Functionalization of mesoporous silica using an amino group is normally conducted by post-synthesis reaction using 3-aminopropyltrimethoxysilane (APMS) molecules. However, using APMS molecules has inadvertently blocked the mesochannels and therefore suppressed the textural properties of mesoporous silica.

To prevent the blocking of mesochannels, anionic mesoporous silica (AMS) has shown a tremendous enhancement on the adsorption properties of the silica, since AMS has a built-in amino group with co-structure directing agent (CSDA) acting as mediator to bind the negatively charged anionic surfactant with negatively charged silicate species. AMS has therefore shown a more superior performance for adsorption of metal cations compared to the post synthesis process due to the non-blocking of mesochannels with amino groups. However, the enhancement of the adsorption property of AMS through adding a higher amount of APMS molecules can cause the loss of its mesoporous AMS character, resulting in a non-porous nature.

Many studies have reported the synthesis of AMS. However, so far none of these studies have simultaneously utilized different types of CSDA to construct double and triple CSDA systems.

The development of new anionic mesoporous silica and synthesis methods for the same solving the aforementioned problems are desired.

SUMMARY

The present subject matter relates to the development of amino-rich anionic mesoporous silica (AMS) nanoparticles that counter the degradation of ordering and textural properties of the AMS through adding two different types of co-structuring directing agent (CSDA) molecules, thus increasing the amino amount within the AMS together with preserving ordered porous structure. Further boosting of the amino amount can be accomplished through linking three different CSDA molecules together. Such amino-functionalized mesoporous silica can be obtained with a high amino amount with linking either double or triple CSDA molecules while preserving ordered mesoporous structure and high textural properties.

In an embodiment, the present subject matter relates to a method of preparing amino-rich anionic mesoporous silica (AMS)nanoparticles, the method comprising: adding HCl to an aqueous solution of an anionic surfactant to transform the anionic surfactant to its hydrogen form; adding a first co-structure directing agent (CSDA) that is a first amino silane to the aqueous solution; adding a second co-structure directing agent (CSDA) that is a second amino silane to the aqueous solution; adding a tetraethyl orthosilicate to the aqueous solution to form a mixture; subjecting the mixture to ultrasonic waves to obtain a sonicated mixture; heating the sonicated mixture; and obtaining the amino-rich silica mesoporous (AMS) nanoparticles.

In another embodiment, the present subject matter relates to a method of preparing amino-rich anionic mesoporous silica (AMS) nanoparticles, the method comprising: adding HCl to an aqueous solution of an anionic surfactant to transform the anionic surfactant to its hydrogen form; adding a first co-structure directing agent (CSDA) that is a first amino silane to the aqueous solution; adding a second co-structure directing agent (CSDA) that is a second amino silane to the aqueous solution; adding a third co-structure directing agent (CSDA) that is a third amino silane to the aqueous solution; adding a tetraethyl orthosilicate to the aqueous solution to form a mixture; subjecting the mixture to ultrasonic waves to obtain a sonicated mixture; heating the sonicated mixture; and obtaining the amino-rich silica mesoporous (AMS) nanoparticles.

In a further embodiment, the present subject matter relates to amino-rich anionic mesoporous silica (AMS) nanoparticles prepared according to the present methods.

In one more embodiment, the present subject matter relates to a method of treating wastewater comprising contacting the wastewater with the amino-rich anionic mesoporous silica (AMS) nanoparticles described herein.

These and other features of the present subject matter will become readily apparent upon further review of the following specification.

BRIEF DESCRIPTION OF THE DRAWINGS

FIG. 2B: 0.1 ml APTS-1.5 ml TEOS-0.1 ml APMS-0.1 ml N3, FIG. 2C: 0.1 ml APTS-1.0 ml TEOS-0.1 ml APMS-0.5 ml TEOS-0.1 ml N3, and FIG. 2D: 0.1 ml APTS-0.1 ml APMS-0.1 ml N3-1.5 ml TEOS (all with sonication).

DETAILED DESCRIPTION OF THE PREFERRED EMBODIMENTS

Figures 1A, 1B, 1C, 1D, 1E, 1F:
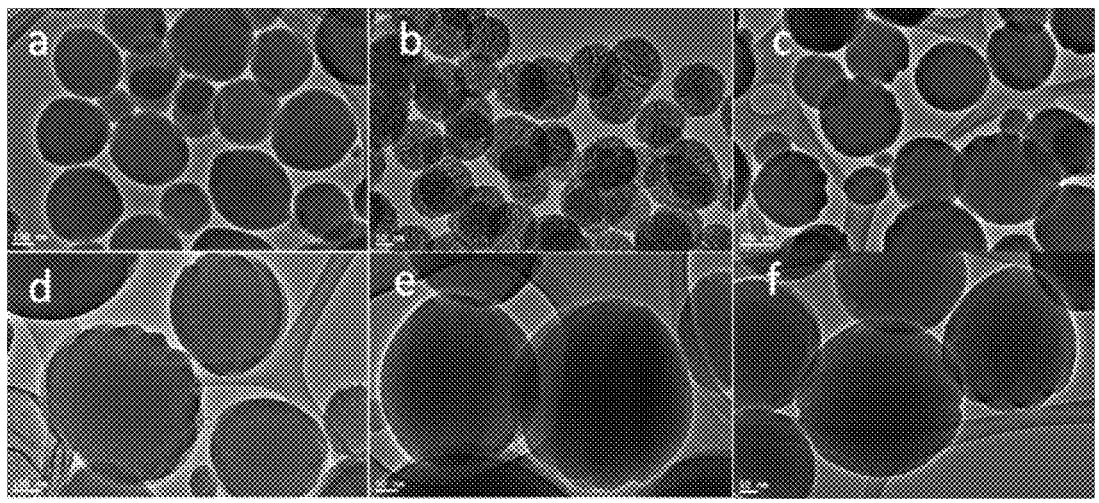
FIGS. 1A-1F show TEM images of mesoporous silica nanoparticles prepared by single CSDA systems (FIG. 1A: 0.1 mL APMS and FIG. 1B: 0.1 mL APTS), and by double CSDA systems using FIG. 1C (0.1 mL APMS and 0.1 mL APTS) and FIG. 1D (0.1 mL APTS and 0.1 mL APMS) without sonication and using FIG. 1E (0.1 mL APMS and 0.1 mL APTS) and FIG. 1F (0.1 mL APTS and 0.1 mL APMS) with sonication.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to a method of preparing amino-rich anionic mesoporous silica (AMS)nanoparticles, the method comprising: adding HCl to an aqueous solution of an anionic surfactant to transform the anionic surfactant to its hydrogen form; adding a first co-structure directing agent (CSDA) that is a first amino silane to the aqueous solution; adding a second co-structure directing agent (CSDA) that is a second amino silane to the aqueous solution; adding a tetraethyl orthosilicate to the aqueous solution to form a mixture; subjecting the mixture to ultrasonic waves to obtain a sonicated mixture; heating the sonicated mixture; and obtaining the amino-rich silica mesoporous (AMS) nanoparticles.

In another embodiment, the present subject matter relates to a method of preparing amino-rich anionic mesoporous silica (AMS)nanoparticles, the method comprising: adding HCl to an aqueous solution of an anionic surfactant to transform the anionic surfactant to its hydrogen form; adding a first co-structure directing agent (CSDA) that is a first amino silane to the aqueous solution; adding a second co-structure directing agent (CSDA) that is a second amino silane to the aqueous solution; adding a third co-structure directing agent (CSDA) that is a third amino silane to the aqueous solution; adding a tetraethyl orthosilicate to the aqueous solution to form a mixture; subjecting the mixture to ultrasonic waves to obtain a sonicated mixture; heating the sonicated mixture; and obtaining the amino-rich silica mesoporous (AMS) nanoparticles.

In one embodiment of the present methods, the anionic surfactant can be N-lauroylsarcosine sodium. In another embodiment of the present methods, 0.1 M of the HCl can be added to the aqueous solution of the anionic surfactant.

In certain embodiments, the first amino silane can be 3-aminopropyltrimethoxysilane (APMS). In further embodiments, the second amino silane can be 3-aminopropyltriethoxysilane (APTS). Similarly, the third amino silane can be N-[3-(trimethoxysilyl)propyl]ethylenediamine (N3).

According to the present methods, the amino-silane co-structure directing agents (CSDA) can help to combine negatively charged surfactant molecules with negatively charged silica species where an amino group interacts with surfactant molecules and silane is condensed with silica species. Upon solvent extraction to remove a surfactant, amino functionalized mesoporous silica is obtained. Amino functionalized mesoporous silica can be utilized in many applications such as adsorptive removal of pollutants and heavy metals, drug delivery, and catalysis.

In another embodiment, the heating step can be conducted at about 70° C. to about 90° C. for at least about 18 hours.

In a further embodiment, the amino-rich silica mesoporous (AMS) nanoparticles can be obtained by centrifugation followed by washing and drying.

The present methods can result in amino-rich anionic mesoporous silica (AMS) nanoparticles that maintain a mesoporous structure along with their porous character, all while having an increased amino level.

In other embodiments, the present subject matter relates to amino-rich anionic mesoporous silica (AMS) nanoparticles produced according to the methods as described herein.

In this regard, the present amino-rich silica mesoporous (AMS) nanoparticles can comprise three-dimensional curved structure silica mesoporous nanoparticles.

In certain embodiments, the present nanoparticles can have a total pore volume of about 0.45 to about 0.6 $cm^3/g$. In this regard, the nanoparticles can have a total pore volume of about 0.484 to about 0.585 $cm^3/g$.

In other embodiments, the present nanoparticles can have a total N content of about 3.5% to about 4%. In this regard, the nanoparticles can have a total N content of about 3.59% to about 3.72%.

In further embodiments, the present nanoparticles can have a total surface area of about 292 $m^2/g$.

In another embodiment, the present subject matter relates to a method for treating wastewater comprising contacting wastewater with the amino-rich anionic mesoporous silica (AMS) nanoparticles as described herein.

In certain embodiments, the method results in adsorptive removal of one or more of heavy metal cations and organic dyes from the wastewater. In other embodiments, the method results in $CO_2$ adsorption from the wastewater. In further embodiments, the method results in removal of uranium cations from the wastewater.

The present subject matter is further described by referring to the following examples.

EXAMPLES

Example 1

Amino-functionalized mesoporous silica was prepared using anionic surfactant and double co-structure directing agents (double CSDA) system as follows: 0.2933 M anionic surfactant, N-lauroylsarcosine sodium, was dissolved in 30 mL of water. Thereafter, 4 mL of 0.1 M HCl was added to transform the surfactant from sodium form to its hydrogen form. 0.1 mL of a first CSDA, (APMS (3-aminopropyltrimethoxysilane) was then added under constant stirring for 2 min. Thereafter, a 0.1 mL of a second CSDA APTS(3-aminopropyltriethoxysilane) was added. Afterward, 1.5 mL of tetraethyl orthosilicate (TEOS) was then added under continuous stirring for an additional 30 min. The mixture was then subjected to ultrasonic waves from an ultrasonic homogenizer for 2 min. The mixture was left for 1 h to relax and finally heated at 80° C. for 18 h. The final solid product was recovered by centrifugation, washed with deionized water, and dried inside an oven at 60° C. for 12 h.

Example 2

Amino-functionalized mesoporous silica was prepared using anionic surfactant and triple co-structure directing agents system as follows: 0.2933 M anionic surfactant, N-lauroylsarcosine sodium, was dissolved in 30 mL of water. Thereafter, 4 mL of 0.1 M HCl was added to transform the surfactant from its sodium form to its hydrogen form. 0.1 mL of a first CSDA, (APMS (3-aminopropyltrimethoxysilane) was then added under constant stirring for 2 min. Thereafter, a 0.1 mL of a second CSDA APTS(3-aminopropyltriethoxysilane) was added. Finally, 0.1 mL of N-[3-(Trimethoxysilyl)propyl]ethylenediamine (N3) was added. Afterward, 1.5 mL from tetraethyl orthosilicate (TEOS) was then added under continuous stirring for an additional 30 min. The mixture was then subjected to ultrasonic waves from an ultrasonic homogenizer for 2 min. The mixture was left for 1 h to relax and finally heated at 80° C. for 18 h. The final solid product was recovered by centrifugation, washed with deionized water, and dried inside an oven at 60° C. for 12 h.

Example 3

Table 1 presented below shows various synthesis parameters and textural properties for mesoporous silica nanoparticles prepared by single and double CSDA systems under different conditions.

TABLE 1

| S.N. | Surfactant (g) | $H_2O$ (ml) | HCl (ml) | CSDA 1 (ml) | CSDA2 (ml) | TEOS (ml) | Type CSDA System | Surface Area $m^2/g$ | Total Pore Volume cc/g |
|---|---|---|---|---|---|---|---|---|---|
| 1 | Anionic 0.2933 | 30 | 4 | 0.1APMS | — | 1.5 | Single | 620.7 | 1.148 |
| 2 | Anionic 0.2933 | 30 | 4 | 0.1APTS | — | 1.5 | Single | 409.3 | 0.827 |
| 3 | Anionic 0.2933 | 30 | 4 | 0.2APMS | — | 1.5 | Single | 117.6 | 0.251 |
| 4 | Anionic 0.2933 | 30 | 4 | 0.1APMS | 0.1APTS | 1.5 | Double | 456.0 | 0.397 |
| 5 | Anionic 0.2933 | 30 | 4 | 0.1APTS | 0.1APMS | 1.5 | Double | 394.7 | 0.353 |
| 6 | Anionic 0.2933 | 30 | 4 | 0.1APMS | 0.1APTS | 1.5 | Double/sonic | 380.7 | 0.369 |
| 7 | Anionic 0.2933 | 30 | 4 | 0.1APTS | 0.1APMS | 1.5 | Double/sonic | 146.9 | 0.198 |

Example 4

When single 3-Aminopropyltrimethoxysilane (APMS) molecules were used, round mesoporous silica nanoparticles were formed of a size around 200 nm as shown in FIG. 1A. Upon introducing (3-Aminopropyltriethoxysilane (APTS)) as a single co-structure directing agent, hollow inter-connected mesoporous silica nanoparticles were formed with a much smaller particle size approaching 100 nm as in FIG. 1B.

When a double CSDA system was implemented with the sequence of addition of APMS and APTS simultaneously added, three-dimensional curved structure mesoporous silica particles were formed with sea-shell morphology where the particles share a central point as shown in FIG. 1C. Changing the sequence of addition to APTS then APMS produced three-dimensional curved structure mesoporous silica particles that share a central line as shown in FIG. 1D.

Finally, application of sonication waves resulted in the formation of three-dimensional curved structure mesoporous silica particles that share a central line regardless of the applied sequence of addition (FIGS. 1E and 1F).

Example 5

Figures 2A, 2B, 2C, 2D:
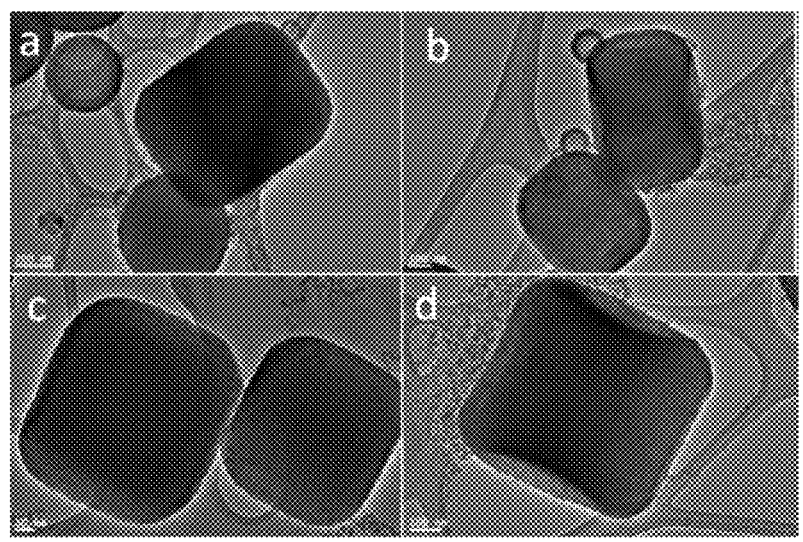
FIGS. 2A-2D show TEM images of mesoporous silica nanoparticles prepared by FIG. 2A: a double CSDA system using (0.1 mL APTS and 0.2 mL N3), or a triple CSDA system using

Table 2 shows sample codes, textural properties, and nitrogen content for mesoporous silica nanoparticles prepared by triple/tertiary CSDA systems at different synthesis conditions.

shows a TEM image of mesoporous silica nanoparticles prepared using a triple CSDA system of 0.1 mL APTS, 1.5 mL TEOS, 0.1 mL APMS, and 0.1 mL N3. FIG. 2C shows a TEM image of mesoporous silica nanoparticles prepared using a triple CSDA system of 0.1 mL APTS, 1.0 mL TEOS, 0.1 mL APMS, 0.5 mL TEOS, and 0.1 mL N3. FIG. 2D shows a TEM image of mesoporous silica nanoparticles prepared using a triple CSDA system of 0.1 mL APTS, 0.1 mL APMS, 0.1 mL N3, and 1.5 mL TEOS. All mesoporous silica nanoparticles of FIGS. 2A-2D were prepared using sonication.

Example 7

Figure 3A:
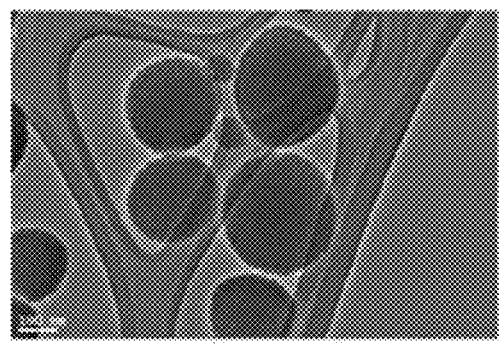
FIGS. 3A-3C show schematic diagrams for the impact of CSDA content on the morphology and porous character of AMS.

As seen in FIG. 3A, for mesoporous silica nanoparticles prepared at greater than or equal to 0.28% v/v from a single CSDA system of APMS or APTS, the nanoparticles had a low-amino content and a porous character was maintained.

Figure 3B:
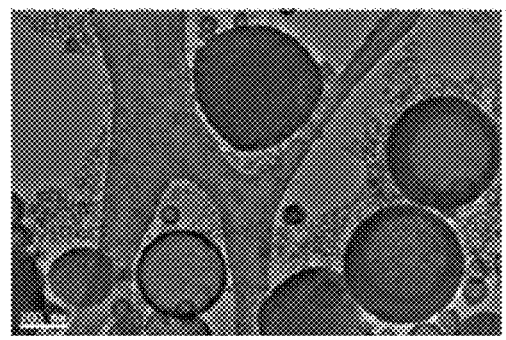

As seen in FIG. 3B, for mesoporous silica nanoparticles prepared at greater than or equal to 0.56% v/v from a single CSDA system of APMS or APTS, the nanoparticles had a low-amino content and a porous character was lost.

Figure 3C:
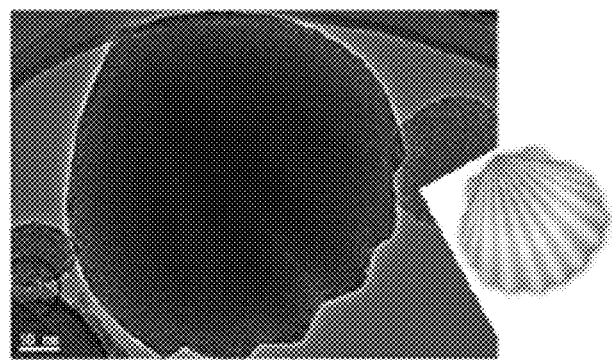

As seen in FIG. 3C, for mesoporous silica nanoparticles prepared at greater than or equal to 0.56% v/v from a double CSDA system of APMS and APTS, the nanoparticles had a high-amino content and a porous character was maintained.

TABLE 2

| S.N. | Sample's code | System Type | conditions | Surface Area/ $m^2/g$ | Total pore volume/CC/g | N content/ % |
|---|---|---|---|---|---|---|
| 1 | D-1t-1m | Double/sonic | 0.1 ml APTS-after 5 min 1.5 ml TEOS-then add 0.1 ml APMS | 194.4 | 0.375 | 2.77 |
| 2 | D-1t-1n3 | Double/sonic | 0.1 ml APTS-after 5 min 1.5 ml TEOS-then add 0.1 ml N3 | 253.8 | 0.324 | 3.28 |
| 3 | T-1t-1m-1n3 | Triple/sonic | 0.1 ml APTS after 5 min 1.5 ml TEOS-then add 0.1 ml APMS-0.1 ml N3 | 283.1 | 0.484 | 3.72 |
| 4 | D-1t-2n3 | Double sonic | 0.1 ml APTS-after 5 min 1.5 ml TEOS-then add 0.2 ml N3 | 336.6 | 0.510 | 3.33 |
| 5 | T-1t-TEOS-1m-1n3 | Triple/sonic | 0.1 ml APTS-after 5 min 1.0 ml TEOS-then add 0.1 ml APMS then 0.5 ml TEOS-0.1 ml N3 | 268.1 | 0.585 | 3.59 |
| 6 | S-1m-TEOS | Single/sonic | 0.1 ml APMS-after 5 min 1.5 ml TEOS | 1.148 | 620.7 | 1.54 |
| 7 | S-2m-TEOS | Single/Sonic | 0.2 ml APM-after 5 min 1.5 ml TEOS | 117.6 | 0.251 | 1.68 |

Example 6

TEM images of mesoporous silica nanoparticles prepared as described herein can be seen in FIGS. 2A-2D. FIG. 2A shows a TEM image of mesoporous silica nanoparticles prepared using a double co-structure directing agent (CSDA) system of 0.1 mL APTS and 0.2 mL N3. FIG. 2B

Example 8

Table 3 shows synthesis parameters and textural properties for mesoporous silica nanoparticles prepared by a double CSDA system at different amounts of water.

TABLE 3

| S.N. | No. Of CSDA | Surfactant (g) | H2O (mL) | HCL (mL) | CSDA 1 (mL) | CSDA2 (mL) | TEOS (mL) | System type | Surface Area $m^2/g$ | Total pore volume cc/g |
|---|---|---|---|---|---|---|---|---|---|---|
| 1 | 2 | 0.2933 | 15 | 4 | 0.1APTS | 0.1APMS | 1.5 | Double/sonic | 385.1 | 0.461 |
| 2 | 2 | 0.2933 | 30 | 4 | 0.1APTS | 0.1APMS | 1.5 | Double/sonic | 146.9 | 0.198 |
| 3 | 2 | 0.2933 | 45 | 4 | 0.1APTS | 0.1APMS | 1.5 | Double/sonic | 249.3 | 0.274 |
| 4 | 2 | 0.2933 | 60 | 4 | 0.1APTS | 0.1APMS | 1.5 | Double/sonic | 256.8 | 0.336 |

Example 9

Table 4 shows synthesis parameters and textural properties for mesoporous silica nanoparticles prepared by double and triple CSDA systems at different sequences of addition of TEOS.

TABLE 4

| S.N. | System type | Surfactant (g) | CSDA 1 (mL) | TEOS (mL) | CSDA2 (mL) | TEOS (mL) | CSDA3 (mL) | TEOS (mL) | Surface Area $m^2/g$ | Total pore volume cc/g |
|---|---|---|---|---|---|---|---|---|---|---|
| 1 | Double/sonic | 0.2933 | 0.1APTS | 1.5 | — | — | 0.2 N3 | — | 336.6 | 0.51 |
| 2 | Triple/sonic | 0.2933 | 0.1APTS | 1.5 | 0.1APMS | — | 0.1 N3 | — | 283.1 | 0.484 |
| 3 | Triple/sonic | 0.2933 | 0.1APTS | 1.0 | 0.1APMS | 0.5 | 0.1 N3 | — | 268.1 | 0.585 |
| 4 | Triple/sonic | 0.2933 | 0.1APTS | — | 0.1APMS | — | 0.1 N3 | 1.5 | 292.1 | 0.5 |

Example 10

Figure 4:
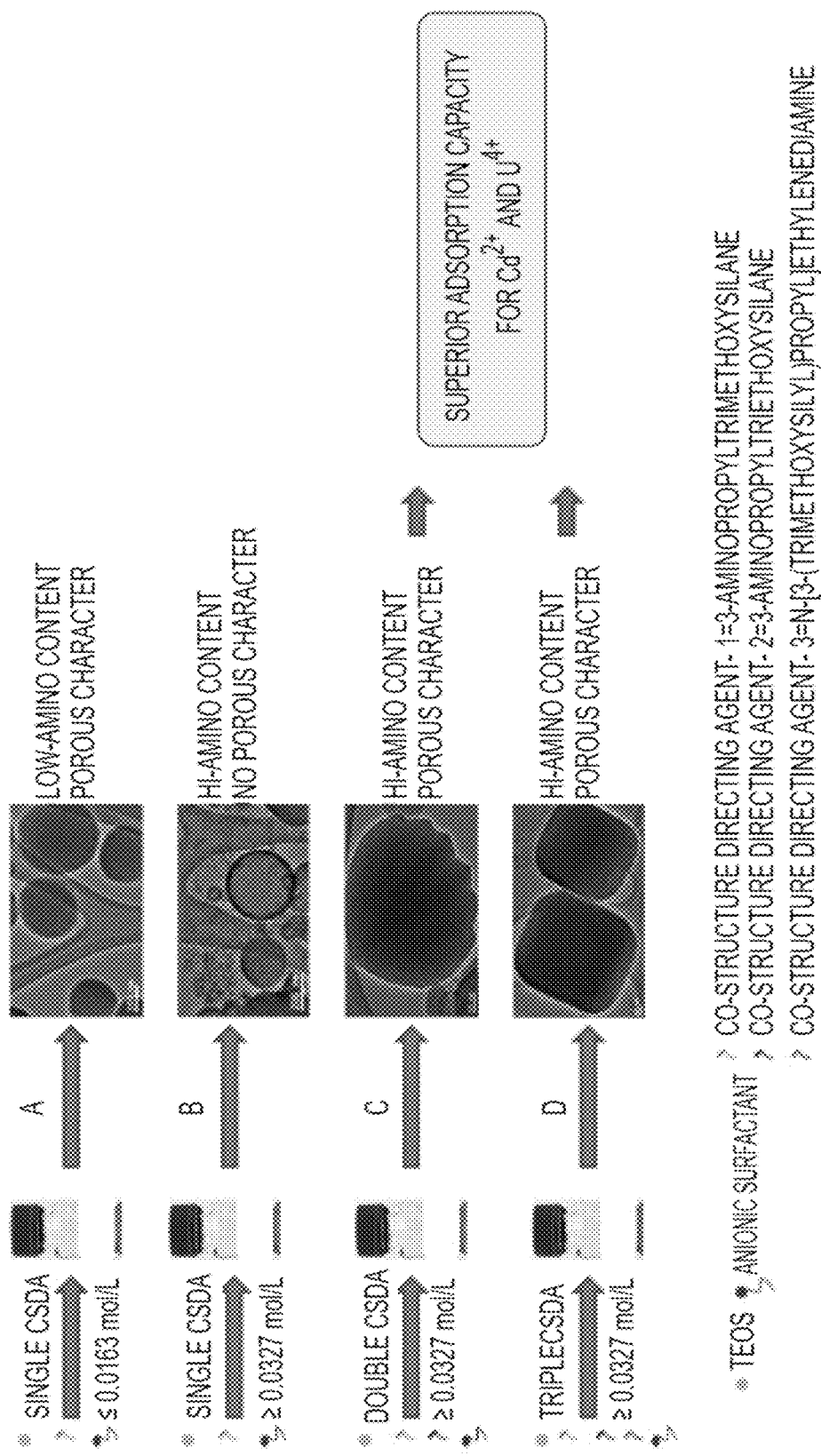
FIG. 4 shows how the enhancement of the adsorption property of AMS through adding a higher amount of APMS molecules typically causes the loss of its mesoporous AMS character, resulting in a non-porous nature.

FIG. 4 provides a flowchart showing how the enhancement of the adsorption property of AMS through adding a higher amount of APMS molecules typically causes the loss of its mesoporous AMS character, resulting in a non-porous nature. FIG. 4 demonstrates that using a double or triple CSDA system results in a mesoporous silica nanoparticle product having a high amino content and a porous character, which is not the case when a single CSDA system is used. In particular, Examples A and B in FIG. 4 show that using a single CSDA system resulted in a mesoporous silica nanoparticle product having a high amino content or a porous character, but not both.

It is to be understood that the anionic mesoporous silica nanoparticles are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method of preparing amino-functionalized anionic mesoporous silica (AMS) nanoparticles, the method comprising:
   adding HCl to an aqueous solution of an anionic surfactant to transform the anionic surfactant to its hydrogen form;
   adding a first amino silane to the aqueous solution;
   adding a second amino silane to the aqueous solution;
   adding a third amino silane to the aqueous solution;
   adding a tetraethyl orthosilicate to the aqueous solution to form a mixture;
   subjecting the mixture to ultrasonic waves to obtain a sonicated mixture;
   heating the sonicated mixture; and
   obtaining the amino-functionalized silica mesoporous (AMS) nanoparticles.

2. The method of claim 1, wherein the anionic surfactant is N-lauroylsarcosine sodium.

3. The method of claim 1, wherein 0.1 M of the HCl is added to the aqueous solution of the anionic surfactant.

4. The method of claim 1, wherein the first amino silane is 3-aminopropyltrimethoxysilane (APMS).

5. The method of claim 1, wherein the second amino silane is 3-aminopropyltriethoxysilane (APTS).

6. The method of claim 1, wherein the third amino silane is N-[3-(trimethoxysilyl)propyl]ethylenediamine (N3).

7. The method of claim 1, wherein each of the first amino silane, the second amino silane, and the third amino silane are added at a volume of about 0.1 mL to about 0.2 mL.

8. The method of claim 1, wherein the heating step is conducted at about 70° C. to about 90° C. for at least about 18 hours.

9. The method of claim 1, wherein the amino-functionalized silica mesoporous (AMS) nanoparticles are obtained by centrifugation followed by washing and drying.

10. Amino-functionalized anionic mesoporous silica (AMS) nanoparticles produced according to the method of claim 1.

11. The amino-functionalized silica mesoporous (AMS) nanoparticles of claim 10, comprising three-dimensional curved structure silica mesoporous nanoparticles.

12. The amino-functionalized silica mesoporous (AMS) nanoparticles of claim 10, wherein the nanoparticles have a total pore volume of about 0.45 to about 0.6 $cm^3/g$.

13. The amino-functionalized silica mesoporous (AMS) nanoparticles of claim 12, wherein the nanoparticles have a total pore volume of about 0.484 to about 0.585 $cm^3/g$.

14. The amino-functionalized silica mesoporous (AMS) nanoparticles of claim 10, wherein the nanoparticles have a total N content of about 3.5% to about 4%.

15. The amino-functionalized silica mesoporous (AMS) nanoparticles of claim 14, wherein the nanoparticles have a total N content of about 3.59% to about 3.72%.

16. The amino-functionalized silica mesoporous (AMS) nanoparticles of claim 14, wherein the nanoparticles have a total surface area of about 292 $m^2/g$.

17. A method for treating wastewater comprising contacting wastewater with the amino-functionalized anionic mesoporous silica (AMS) nanoparticles of claim 10.

18. The method of claim 17, wherein the method results in adsorptive removal of one or more of heavy metal cations and organic dyes from the wastewater.

19. The method of claim 17, wherein the method results in $CO_2$ adsorption from the wastewater.

20. The method of claim 17, wherein the method results in removal of uranium cations from the wastewater.

* * * * *